July 3, 1945.  R. G. ANDERSON  2,379,847
ROTATIVE WINGED AIRCRAFT
Filed Nov. 18, 1941
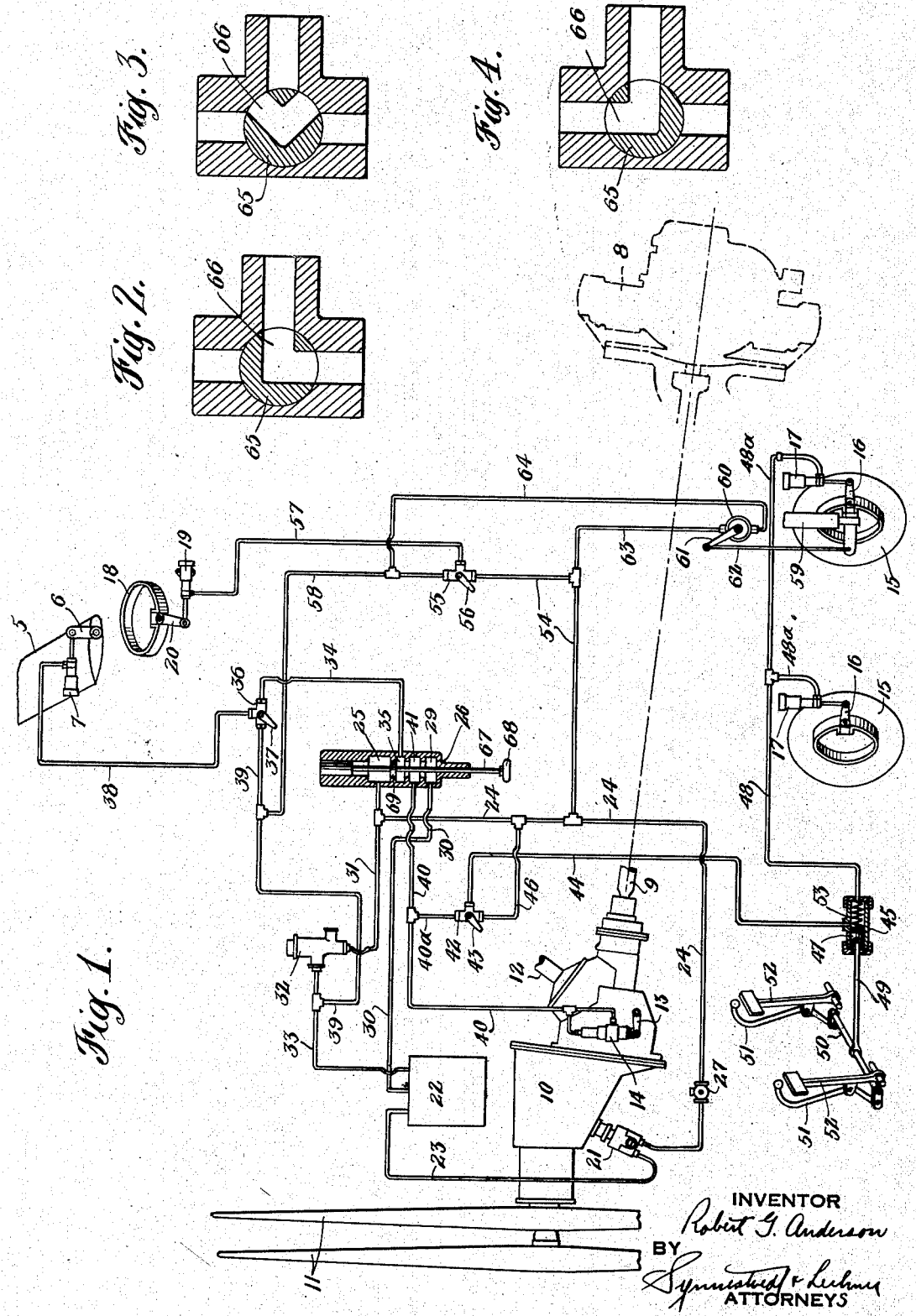
INVENTOR
Robert G. Anderson
BY
ATTORNEYS Patented July 3, 1945

2,379,847

UNITED STATES PATENT OFFICE 2,379,847

ROTATIVE WINGED AIRCRAFT

Robert G. Anderson, Doylestown, Pa., assignor to Autogiro Company of America, Philadelphia, Pa., a corporation of Delaware Application November 18, 1941, Serial No. 419,531

9 Claims. (Cl. 244—18)

This invention relates to rotative winged aircraft, and particularly to certain controls therefor.

The type of rotative winged aircraft with which the invention is especially concerned is that in which the rotor (or rotors) is normally intended to be autorotationally or aerodynamically rotated in flight, but in which the rotor may be driven while at rest on the ground in preparation for take-off with the rotor blade pitch angle reduced, so that an initial high R. P. M. may be imparted to the rotor and the kinetic energy thus stored may be released and converted to lift by increase of the rotor blade pitch. In this way substantially vertical or "direct" take-off may be effected, the take-off preferably being accompanied by disconnection of the rotor drive. This general type of take-off is described more fully in copending application of Juan de la Cierva, Serial No. 738,349, filed August 3, 1934, and is also mentioned in copending application of Agnew E. Larsen, Serial No. 363,593, filed October 31, 1940, which latter application has issued as Patent No. 2,324,588, it being noted that said Larsen application further discloses certain other features referred to hereinafter, the same being described only briefly herein since they form no part of the present invention per se.

In effecting direct take-off, it is desirable that the aircraft remain stationary on the ground during the period of mechanical drive of the rotor prior to the jump. With this in mind the present invention contemplates the employment of wheel brakes, the operation of which is coordinated with the take-off controls in a manner providing for automatic application of the wheel brakes when the controls are adjusted to initiate rotation of the rotor, and for automatic release of the wheel brakes when the controls are adjusted to effect take-off.

According to the invention, provision is also made for manual operation of the wheel brakes whenever desired.

The invention also contemplates other control features, having especial reference to interlocks and automatic safety devices whereby the desired type of operation is always assured.

Various of the features of the invention can best be understood following a description of the control system herein contemplated, to which reference is now made, as illustrated in the drawing.

Figure 1 is a schematic layout of certain parts and devices of the aircraft, with the control system of this invention applied thereto; and Figures 2, 3 and 4 are enlarged sectional views illustrating the three positions of a three-way control valve employed in accordance with the invention.

Referring first to Figure 1, the root end of a rotor blade is fragmentarily indicated at 5, it being understood that this represents one out of a plurality of blades which are desirably pivotally connected with a common rotative hub, so as to provide freedom for "flapping" and pitch change movement. A suitable blade mounting for this purpose is fully disclosed in Patent No. 2,216,163, issued October 1, 1940, to James G. Ray. As shown in said Ray patent, the pitch of the blade is controllable by means of an arm 6 with which the cylinder and piston device 7 cooperates. The control system for device 7 is described below.

The rotor is adapted to be driven by an engine indicated in dotted outline at 8, from which power is transmitted forwardly through shaft 9 which enters the transmission designated generally by the numeral 10. This transmission may take the form fully disclosed in my Patent No. 2,217,883, issued October 15, 1940, and not only provides for drive of the tandem airscrews 11 but also for drive of shaft 12 which is extended upwardly to the rotor hub and connected therewith through gearing and, if desired, through an overrunning clutch so as to ensure free rotation of the rotor in normal flight.

The transmission 10 incorporates a rotor drive clutch actuable by an arm 13 so that shaft 12 may be connected and disconnected with reference to the power shaft 9. Said transmission 10 still further provides for drive of the airscrews 11 at two different speeds, a low speed when the rotor drive clutch is connected, and a high speed when the rotor drive clutch is disconnected, this being of importance for reasons fully set out in my patent above mentioned. The two speed airscrew drive and the rotor drive clutch are both controllable by a cylinder and piston device 14 more fully disclosed in the Larsen application above referred to. The control system of the present invention includes means for supplying actuating fluid to device 14.

Landing wheels for the aircraft are shown at 15, each wheel being equipped with a brake actuable by an arm 16, movement of which is effected by brake cylinder 17. A rotor brake 18 is actuable by a brake cylinder 19 through the medium of an arm 20.

The control system of the present invention is associated with the parts and devices of the aircraft referred to above. The system includes a source of fluid pressure, such as pump 21 having a power takeoff at any suitable point in the transmission 10 and deriving fluid (usually oil) from reservoir 22 through the connection 23. The discharge or pressure side of the pump is connected by piping 24 with chamber 25 in the primary or master control valve generally indicated at 26. Line 24 contains a check valve 27 capable of retaining pressure in the control system for a considerable period of time after stoppage of pump 21, as when the engine 8 is shut off.

The primary control valve 26 has a low pressure chamber 29 which is coupled through pipe 30 with the low pressure reservoir 22. Fluid return to the reservoir may also take place through pipe 31 which interconnects the pressure line 24 and the pressure regulator 32, the discharge from the regulator being connected with the reservoir through pipe 33. Regulator 32 may be adjustably set to establish any desired normal pressure in the system.

For supplying fluid pressure to the blade pitch control device 7, a pipe 34 communicates with chamber 35 of valve 26 and extends therefrom to a three-way valve 36 having a controlling handle 37. Pipe 38 interconnects valve 36 and the device 7. A return or relief line 39 extends from the valve 36 to the low pressure connection 33 which is coupled with reservoir 22.

Pressure is supplied to the rotor drive clutch device 14 through pipe 40 which interconnects that device and chamber 41 of valve 26. A branch 40a of pipe 40 is connected with three-way valve 42 having an operating handle 43. Pipe 44 extends from this valve to the wheel brake master cylinder generally indicated at 45. A high pressure line 46 interconnects supply line 24 with valve 42 for a purpose to be described hereinafter.

With the piston 47 of the master cylinder 45 for the wheel brakes in the position shown, the pressure admitted to the cylinder from pipe 44 is delivered directly to connection 48 having branches 48a which are coupled with the wheel brake cylinder 17.

Piston 47 of the master cylinder 45 is adapted to be operated by the pilot through stem 49 which is connected with the center point of rod 50, the ends of this rod being attached to brake operating pedals 51 mounted on the rudder pedals 52. When actuated in this way the pilot may directly control application of the brakes, it being noted that the initial movement of the piston 47 closes off communication with the pressure supply line 44. A return spring 53 serves to release the brake pedals.

With respect to the wheel brake and rudder controls 51 and 52, it may be mentioned that link 49 is preferably coupled with rod 50 at a point close to the mounting axis for the rudder pedals 52, so that movement of the rudder pedals will not actuate the wheel brakes. Appropriate universal or other joints may be provided in the wheel brake operating linkage so as to accommodate the various operating movements of the rudder pedals.

Pressure for operating the rotor brake cylinder 19 is carried through pipe 54 to three-way control valve 55 having an operating handle 56. From this valve the pressure is conducted through pipe 57 to the device 19. A low pressure or relief line 58 extends from valve 55 to the low pressure line 39, the latter being coupled with the reservoir.

The landing wheels are mounted for shock absorption movement, a movable part of a shock strut being indicated at 59, and this movement is employed in the control system to actuate a valve 60 having a control arm 61 which is linked to the movable part of the shock strut as at 62. Valve 60 takes the form of a shut-off valve, the valve being coupled with the pressure line 24 through pipes 63 and 54, and with the relief line 39 (and thus with the reservoir 22) by means of pipes 64 and 58.

Before describing the operation of the control system, the structure of the three-way valves 36, 42 and 55, and also of the primary control valve 26 should be noted.

Each of the three-way valves is constructed as indicated in Figures 2, 3 and 4, there being a valve member proper 65 having a right angle port 66 formed therein. In each of the three three-way valves, the intermediate position of the controlling lever provides the condition illustrated in Figure 3, in which none of the pipes coupled with the valve are interconnected. Movement of the control lever to one side of the mid position interconnects the central pipe connection with the pipe connection at one end of the valve, and movement of the control lever to the other side of the mid position interconnects the central pipe connection with the pipe connection at the other end of the valve, as appears in Figures 2 and 4, respectively.

The primary control valve 26 is of the piston type, having a stem 67 with an operating knob 68, the stem carrying a valve disc 69 intermediate the ends of the valve casing and adapted to cooperate with the partitions forming chambers 35, 41 and 29.

In considering the operation, assume first that the aircraft is on the ground with the engine 8 idling, in preparation for initiating rotation of the rotor for a take-off. At this time all of the valves occupy the positions illustrated in Figure 1. Thus, as to the primary control valve 26, it will be noted that chambers 35 and 41 are both coupled to low pressure through pipe 30. Pressure in the blade pitch control cylinders 7 and in the rotor clutch pitch control cylinder 14 is thus relieved.

When preparing for a take-off, the rotor pitch control valve 36 is positioned to connect pipes 34 and 38 and close off communication with the relief line 39. The rotor brake control valve 55 is positioned to interconnect pipes 57 and 58, and to close off pressure pipe 54, thereby assuring relief of pressure from rotor brake cylinder 19. Still further, valve 42 is positioned to interconnect pipes 44 and 40a, and shut off pressure pipe 46.

With the three-way valves adjusted as mentioned (and with the engine 8 idling), the hand knob 68 for the primary control valve 26 is drawn outwardly, the initial effect of this movement being to admit pressure from chamber 25 to chamber 35 which actuates blade pitch cylinder 7, thereby reducing the rotor blade pitch angle. Further outward movement of knob 68 admits pressure from chamber 35 to chamber 41 (and blocks intercommunication between chamber 41 and the relief chamber 29) from which pressure is transmitted through pipe 40 to the transmission control unit 14 thereby providing low speed airscrew drive and connecting the rotor drive clutch. Rotation of the rotor now commences and the rotor is accelerated by opening the engine throttle until the desired take-off R. P. M. is attained, preferably an R. P. M. substantially above the normal autorotational R. P. M. of flight.

It is to be noted that during this period of rotor drive, pressure is also delivered from pipe 40 through branch 40a and pipe 44 to the master cylinder 45 for the wheel brakes, and thence to the wheel brake actuating cylinder 17. The wheel brakes are, therefore, retained applied during the rotor acelerating period.

When the desired rotor R. P. M. is attained, the master control valve 26 is returned to the position shown in Figure 1, which automatically relieves the pressure in the blade pitch control device 7, the rotor clutch control device 14 and the wheel brake cylinder 17. As a result of this, the rotor drive clutch is disconnected and the rotor blade pitch increased, in the manner referred to in the aforementioned Larsen application and Ray patent. The kinetic energy stored in the roto is converted to lift and the aircraft takes off substantially vertically.

It should be kept in mind that simultaneously with disconnection of the rotor drive the airscrew drive is stepped up, so as to rapidly develop translational movement of the aircraft. This take-off operation is also accompanied by release of the wheel brakes, so that a slight roll on the ground in the course of the take-off may be permitted, when that mode of take-off is desired. Relief of wheel brake pressure is also desiralbe, having in mind that upon return to a landing, the wheels should, of course, be free to rotate upon contact with the ground.

At the take-off, elongation of the shock struts mounting the wheels results in actuation of valve 60 so as to establish communication between pipes 63 and 64. Since these pipes respectively communicate with the high and low pressure sides of the system, inadvertent manipulation of the controls in flight will not result in reduction of rotor blade pitch or application of the rotor brake or connection of the rotor drive. Upon landing, however, valve 60 is again actuated to disconnect pipes 63 and 64 and thereby condition the entire system for use on the ground in making a subsequent take-off.

The arrangement of the controls for the wheel brakes is of paruticular advantage for several reasons, as follows: In the first place, it should be noted that the control system includes foot operated pedals 51 (in addition to the control valve 42). Handle 43 of valve 42 may be adjusted to admit pressure to the wheel brake cylinders from the supply line 24, and this control may be used when the aircraft is on the ground to apply the wheel brakes and also to build up pressure in the wheel brake cylinders 17, which may subsequently be retained by movement of handle 43 to its mid position. Parking at a given point may thereby be assured for a considerable length of time even after the engine 8 (and, therefore, pressure pump 21) as been shut off.

On the other hand, with handle 43 of the brake control valve 42 positioned as shown in Figure 1, the wheel brakes may be operated by pedals 51, notwithstanding the absence of pressure in the control system (as when the engine is stopped). This foot pedal operation depends upon the effort exerted by the pilot and not on any power source. Master cylinder 45 and the pipe connections extended therefrom to the brake cylinders 17 naturally remain filled with oil, so that at any time on the ground the pilot may operate the wheel brakes.

Under certain conditions on the ground it may be desirable to admit and retain fluid pressure in the rotor brake cylinder 19. This may be accomplished by movement of the handle 56 of valve 55 to its position interconnecting pipes 54 and 57 and thereafter by movement of the valve to its mid position, so as to retain the pressure admitted to cylinder 19.

Similarly, pressure may be admitted to the blade pitch control devices 7, by drawing out knob 68 of the main control valve 26 sufficiently to admit pressure from chamber 25 to pipe 34. Upon introduction of the desired pitch-reducing pressure to devices 7, handle 37 of valve 36 may be moved to its mid position so as to retain the blades in low pitch, and thereby avoid undesired development of lift in a wind, when the aircraft is on the ground. Relief of pressure from the cylinders 7 may be effected by adjusting the valve handle 37 to intercoonnect pipes 38 and 39.

From the foregoing it will be seen that the control system of the present invention increases safety of operation by making impossible certain control adjustments which would be undesirable or dangerous, and by simplifying the manipulations required by the pilot. Additionally, the system is highly flexible, being capable of meeting many different operation conditions. This latter is especially true with reference to control of the wheel brakes, provision being made not only for automatic wheel brake operation in a manner interrelated with the functions of direct take-off, but also for two distinct manual operations, one of which (valve 42) utilizes a power source for application of the brakes and provides for parking, and the other of which (pedals 51) is directly operable independently of the power source, so that it may be employed on the ground when the engine and pressure pump are not running.

I claim:

1. For a rotative winged aircraft having a variable pitch sustaining rotor capable of effecting direct take-off and having a landing wheel with a wheel brake, a primary pilot's control organ for controlling the direct take-off maneuver, said primary control organ being adjustable between a position providing a non-lifting rotor blade pitch angle and initiation of rotation of the rotor in preparation for direct take-off and a position providing a direct take-off rotor blade pitch setting, mechanism interrelating the operation of said primary control organ and the wheel brake and providing for application of the wheel brake upon adjustment of the control organ to lower the blade pitch and initiate rotation of the rotor prior to take-off and for release of the wheel brake upon adjustment of the primary control organ to effect direct take-off, and separately controllable means for applying the wheel brake independently of the primary control organ.

2. For a rotative winged aircraft having a variable pitch sustaining rotor capable of effecting direct take-off and having a landing wheel with a wheel brake, a primary pilot's control organ for controlling the direct take-off maneuver, said primary control organ being adjustable between a position providing a non-lifting rotor blade pitch angle and initiation of rotation of the rotor in preparation for direct take-off and a position providing a direct take-off rotor blade pitch setting, a source of fluid pressure, a fluid pressure actuating device for the wheel brake, a fluid pressure control system associated with said source and said device incorporating valve means providing for admission of fluid pressure to said device to apply the wheel brake upon adjustment of the pilot's control organ to its position providing reduced rotor blade pitch angle and initiation of rotation of the rotor before take-off and for release of said fluid pressure to release the wheel brake upon adjustment of the primary control organ to effect direct take-off, and a pilot operated control for applying the wheel brake independently of said primary control organ.

3. A construction in accordance with claim 2 wherein the pilot operated control for the wheel brake is operative independently of the source of fluid pressure.

4. For an aircraft a sustaining rotor with a disconnectible rotor drive and having a landing wheel with a wheel brake, a fluid actuated device for connecting the rotor drive, a fluid actuated device for applying the wheel brake, a source of fluid pressure, and a fluid control system associated with said source and said device and incorporating valve means for admitting pressure fluid from said source to the rotor drive connecting device and for relieving pressure therein, the control system further incorporating two independently operable mechanisms for applying and releasing the wheel brake, one of said mechanisms comprising valve means for admitting pressure fluid from said source to the brake applying device and for relieving the pressure therein, the other of said mechanisms comprising a pilot's control providing for development of pressure in said control system by the force exerted by the pilot on said control, so as to apply the wheel brake independently of the pressure available at said source.

5. A construction in accordance with claim 4 in which the valve means for pressure application of the brake comprises a three-way valve one position of which admits pressure from said source to the brake applying device, another position of which disconnects the source but retains said pressure to hold the brake applied, and the third position of which relieves the pressure in said device to release the brakes.

6. A construction in accordance with claim 4 in which the valve means for pressure application of the brake comprises a manually operable valve, and in which the pilot's control for applying the brake comprises a foot operated pedal.

7. A construction in accordance with claim 4 and further including means automatically operative by landing and take-off of the aircraft to render said control system effective to apply the wheel brake by the pressure of said source when the aircraft is on the ground and ineffective to apply the wheel brake when the aircraft is in flight.

8. For a rotative winged aircraft having a rotor brake and a landing wheel mounted for shock absorption movement, a source of fluid pressure, a fluid pressure cylinder and piston device for actuating the rotor brake, valve means associated with said source and said device for delivering pressure from said source to said device, and mechanism operable by shock absorption movement of the landing gear for dispelling the brake applying pressure upon take-off and re-establishing said pressure upon landing, with said valve means adjusted to brake-on position, whereby, in preparation for landing, said valve means may be adjusted to the "brake-on" position and the brake applying pressure automatically established upon shock absorption movement of the landing gear incident to landing.

9. A construction in accordance with claim 8 wherein said valve means comprises a three-way valve in one position of which pressure from said source is delivered to the brake applying device, in another position of which said source is cut off but the pressure is retained in the brake applying device, and the third position of which relieves the pressure in said device to release the brake.

ROBERT G. ANDERSON.